(12) United States Patent
Simon

(10) Patent No.: US 8,286,287 B2
(45) Date of Patent: Oct. 16, 2012

(54) CONTROL APPARATUS AND CONTROL METHOD FOR AN ELECTRICAL DOMESTIC APPLICANCE

(75) Inventor: Helmut Simon, Argenbühl (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 935 days.

(21) Appl. No.: 12/103,930

(22) Filed: Apr. 16, 2008

(65) Prior Publication Data

US 2008/0256985 A1   Oct. 23, 2008

(30) Foreign Application Priority Data

Apr. 23, 2007 (DE) .......................... 10 2007 019 102

(51) Int. Cl.
*D06F 37/42* (2006.01)
(52) U.S. Cl. ............................... 8/158; 68/12.26
(58) Field of Classification Search ............... 8/158–159; 68/12.16, 12.26
See application file for complete search history.

(56) References Cited

U.S. PATENT DOCUMENTS

| | | | |
|---|---|---|---|
| 4,245,309 A | 1/1981 | Kiefer | |
| 4,275,464 A | 6/1981 | Schmidt | |
| 7,363,546 B2 * | 4/2008 | Duncan | 714/40 |
| 2004/0078697 A1 * | 4/2004 | Duncan | 714/42 |

FOREIGN PATENT DOCUMENTS

| | | |
|---|---|---|
| EP | 0 447 929 A2 | 9/1991 |
| EP | 0702103 A1 | 3/1996 |

* cited by examiner

*Primary Examiner* — Joseph L Perrin
(74) *Attorney, Agent, or Firm* — Laurence A. Greenberg; Werner H. Stemer; Ralph E. Locher

(57) ABSTRACT

A control apparatus for an electrical domestic appliance with a component that presents a danger to the user and a protection component for protecting the user against a danger presented by the dangerous component, has a control device monitoring the operating states of the dangerous component and the protection component and also to activate and/or deactivate the protection component. A protection device prevents a deactivation of the protection component by the control device outside a deactivation operating range of the dangerous component, in which range deactivation of the protection component is permissible. The control apparatus also has a protection-device monitoring device that initiates a deactivation of the protection component within a simulation operating range of the dangerous component within which the operating state of the dangerous component does not present a danger to the user and which range is outside the deactivation operating range. The control device also identifies a malfunction of the protection device if the protection component is actually deactivated when deactivation of the protection component is initiated by the protection-device monitoring device.

13 Claims, 5 Drawing Sheets

CONTROL APPARATUS AND CONTROL METHOD FOR AN ELECTRICAL DOMESTIC APPLICANCE

CROSS-REFERENCE TO RELATED APPLICATION

This application claims the priority, under 35 U.S.C. §119, of German application DE 10 2007 019 102.4, filed Apr. 23, 2007; the prior application is herewith incorporated by reference in its entirety.

BACKGROUND OF THE INVENTION

Field of the Invention

The present invention relates to a control apparatus and to a control method for an electrical domestic appliance, such as a washing machine.

As illustrated in FIG. 6, an electrical domestic appliance (for example a washing machine) has a dangerous, electrically controllable component (for example laundry drum) which presents a direct or indirect danger to the user. The dangerous state may be, for example, a rotary movement, a high temperature or a high water level. A dangerous state of this type exhibits continuous-value behavior, that is to say there is an operating state or signal value at which the danger is very high and there is at least one operating state or signal value at which this danger can be considered insignificant. The respective operating state of the component 10 is available at its output in a form which can be electronically evaluated, so that this signal can be monitored by a control means (microcontroller) 14 at its input 14a directly or by means of a signal-conditioning stage (not illustrated here).

In order to protect the user of the domestic appliance against the danger presented by the component 10, there is also an electrically or electronically controllable protection component 12 which protects the user against the respective danger in a suitable manner. The protection component 12 is, for example, a door lock of a washing machine which prevents the door from being opened and therefore prevents dangerous parts from being touched by the user. The operating state of the protection component 12 is monitored by the control means 14 directly or by way of an evaluation circuit at its input 14b.

The protection component 12 is activated and deactivated by the control means 14 by way of its output 14c. As an alternative, the protection component 12 can be activated, for example, by closing the door lock of a washing machine. In this case, unintentional deactivation of the protection component 12 (for example on account of a malfunction of the control means 14) can lead to a dangerous state.

For this reason, a protection device, a so-called PEC (Protective Electronic Circuit) is provided. The protection device is formed from a feedback branch 16 and a logic combination 18. The protection device 16-18 has the task of preventing deactivation of the protection component 12 by a control signal 14c which may have been incorrectly generated by the control means 14, provided that the dangerous component 10 still presents a danger, as described above, and this can be identified from the output signal of the component 10. The protection device 16-18 forms a second protection instance when the actual deactivation of the protection component 12 is controlled by the program sequence of the control means 14.

Whereas the protection device 16-18 is formed from hardware components in the example of FIG. 6, the protection device 16-18 can alternatively also be implemented as a software solution in the control means 14.

A possible fault in this protection device 16-18 could lead, for example, to the output of the feedback circuit 16 always outputting a logic ONE, irrespective of the operating state of the dangerous component 10. Such a fault could also occur in the logic combination 18, with the result that the control signal 14c of the control means can always pass unhindered. A malfunction of the protection device 16-18 of this type would initially remain unidentified because the control means 14 deactivates the protection component 12, as is intended, only when the dangerous component 10 is in a state which is not dangerous to the user. The fault in the protection device 16-18 would be obvious, because it has no protective effect, only when the control means 14 would emit a deactivation signal 14c, for example due to incorrect behavior of the implemented software, during the dangerous state of the dangerous component 10. However, the state which is dangerous to the user would then have already arisen. A fault of this type is also called a "latent fault."

BRIEF SUMMARY OF THE INVENTION

It is accordingly an object of the invention to provide a control apparatus and control method for an electrical domestic appliance, which overcomes the above-mentioned disadvantages of the heretofore-known devices and methods of this general type and which can identify a "latent fault" of the protection device for the protection component, before the user is put in a dangerous situation.

With the foregoing and other objects in view there is provided, in accordance with the invention, a control apparatus for an electrical domestic appliance having a dangerous component potentially posing a danger to a user and a protection component for protecting the user against the danger posed by the dangerous component, the control apparatus comprising:

a control device configured to monitor operating states of the dangerous component and the protection component, and to selectively activate and deactivate the protection component; and a protection device configured to prevent a deactivation of the protection component by said control device outside a deactivation operating range of the dangerous component in which deactivation is permissible;

a protection-device monitoring device configured to initiate a deactivation of the protection component within a simulation operating range of the dangerous component, in which range the operating state of the dangerous component does not present a danger to the user and which range is outside the deactivation operating range; and said control device being configured to identify a malfunction of the protection device if the protection component is actually deactivated when deactivation of the protection component is initiated by the protection-device monitoring device.

In other words, the control apparatus for an electrical domestic appliance comprising a component which presents a danger to the user and a protection component for protecting the user against a danger presented by the dangerous component contains a control device which is designed to monitor the operating states of the dangerous component and the protection component and also to activate and/or deactivate the protection component; a protection device which is designed to prevent deactivation of the protection component by the control device outside a deactivation operating range of the dangerous component, in which range deactivation of the protection component is permissible; and a protection-device monitoring device which is designed in order to initiate deactivation of the protection component within a simulation operating range of the dangerous component, in which range the operating state of the dangerous component does not present a danger to the user and which range is outside the deactivation operating range of the dangerous component, with the control device identifying a malfunction of the protection device if the protection component is actually deactivated when deactivation of the protection component is initiated by the protection-device monitoring device.

The control apparatus intentionally simulates a faulty deactivation signal for the protection component by the control device. When a protection device is functional, it prevents the actual deactivation of the protection component in the simulation operating range of the dangerous component. If, however, a malfunction of the protection device is present, the protection component is actually deactivated, and this is detected by the control device. The control device identifies the malfunction of the protection device and can react in a suitable manner by, for example, preventing further operation of the electrical domestic appliance. This simulation is performed within an operating range of the dangerous component which still does not present any danger to the user, so that there is no danger to the user.

In a particularly cost-effective embodiment of the invention, the protection device and/or the protection-device monitoring device can be implemented as software sequences in the control device. As an alternative, hardware solutions are also feasible for realizing the two devices.

In a specific application of the invention, the electrical domestic appliance is a washing machine, and the protection component is a door lock. In this case, the dangerous component is, for example, a laundry drum of the washing machine or its motor, and the deactivation operating range and/or the simulation operating range of the dangerous component are/is, for example, defined by means of the rotational speed, the water level and/or the temperature of the laundry drum of the washing machine.

The protection-device monitoring device can deactivate the protection component selectively once after the electrical domestic appliance is switched on; once before a program sequence portion of the control device, in which portion a dangerous state of the dangerous component could occur; at regular time intervals; in each case before a program sequence portion of the control device, in which portion a dangerous state of the dangerous component could occur; or continuously.

In a further refinement of the invention, a malfunction of the protection device is verified by repeated identification of the malfunction.

In a still further refinement of the invention, further operation of the electrical domestic appliance is prevented when a malfunction of the protection device is identified by the control apparatus.

With the above and other objects in view there is also provided, in accordance with the invention, a control method for an electrical domestic appliance having a dangerous component potentially posing a danger to a user and a protection component for protecting the user against the danger posed by the dangerous component, and a control device for activating and/or deactivating the protection component, the method which comprises the following method steps:

monitoring the operating states of the dangerous component and the protection component by the control device;

preventing a deactivation of the protection component by the control device outside a deactivation operating range of the dangerous component, in which range the deactivation of the protection component is permissible;

initiating a deactivation of the protection component within a simulation operating range of the dangerous component, in which range the operating state of the dangerous component does not present a danger to the user and which lies outside the deactivation operating range, by a protection-device monitoring device; and identifying a malfunction of the protection device if the protection component is actually deactivated when deactivation of the protection component is initiated by the protection-device monitoring device.

Other features which are considered as characteristic for the invention are set forth in the appended claims.

Although the invention is illustrated and described herein as embodied in control apparatus and control method for an electrical domestic appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
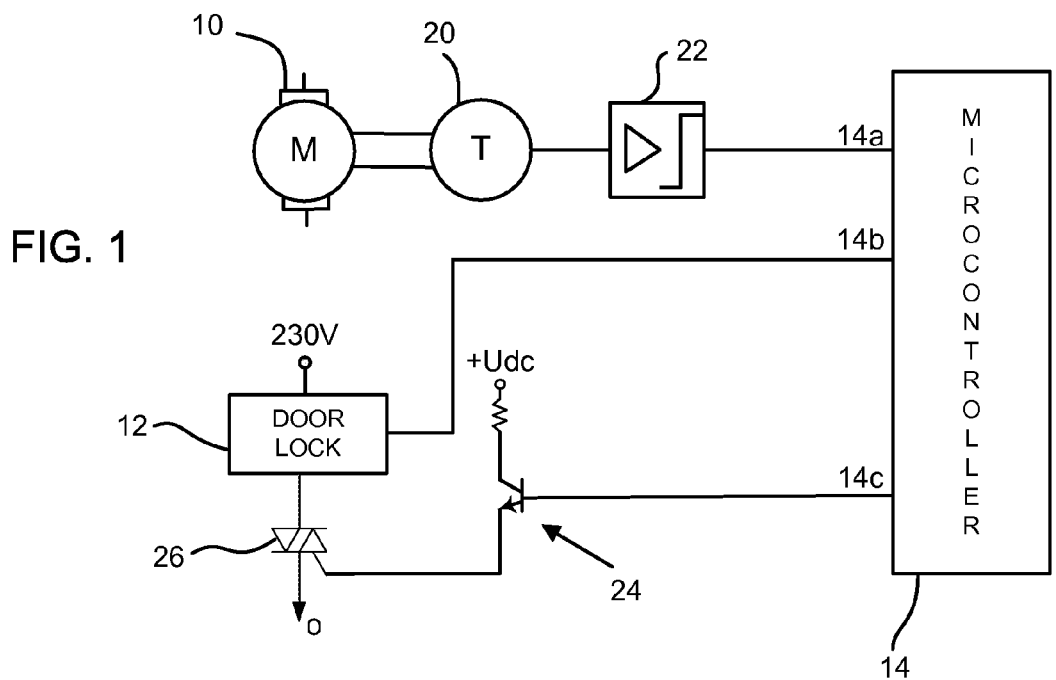
FIG. 1 is a simplified block diagram of a control apparatus for a washing machine, in which the invention can be used.
Figure 2:
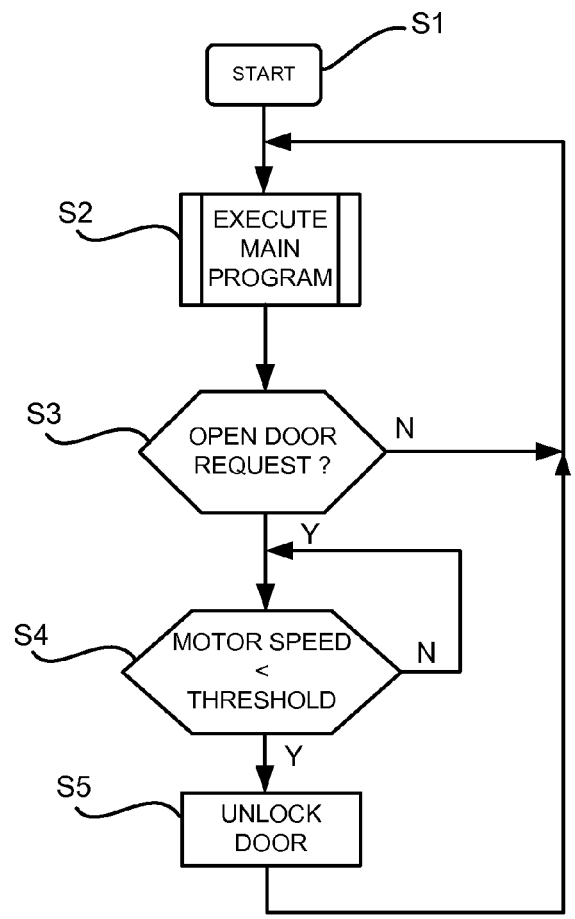
FIG. 2 is a flowchart of a normal control sequence of the control apparatus of FIG. 1.
Figure 6:
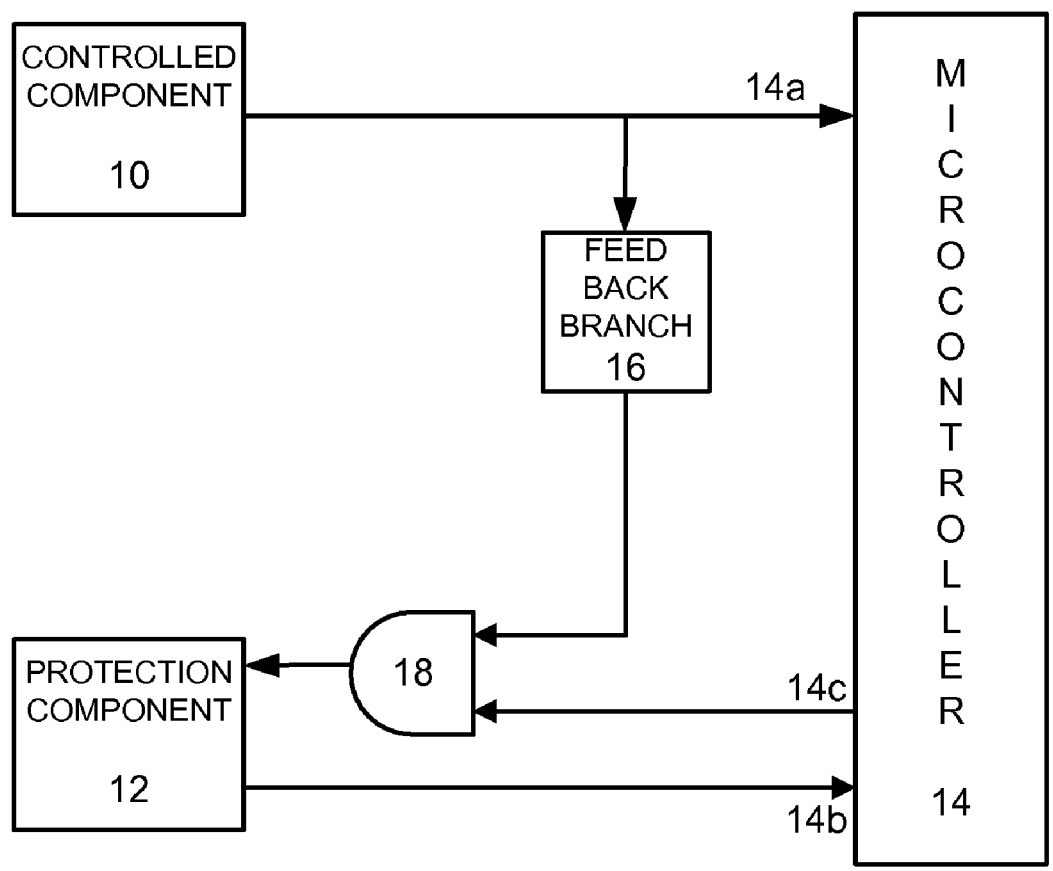
FIG. 6 shows a simplified block diagram of a control apparatus with a protection device according to the prior art.

Referring now to the figures of the drawing in detail and first, particularly, to FIGS. 1 and 2 thereof, there is described the basic layout of an apparatus according to the invention and the way in which a control apparatus for an electrical domestic appliance operates. The description uses the example of a washing machine, in which the present invention can be used. In this case, identical or equivalent components are identified with the same reference numerals as the prior art control apparatus described with reference to FIG. 6.

The washing machine has a dangerous component 10 in the form of a motor of a laundry drum and a protection component 12 in the form of a door lock. When the door of the washing machine is to be opened, it is necessary to ensure that, for example, the rotation speed of the laundry does not exceed a specific threshold value, which presents a danger to the user, at the time at which the door is opened.

In this case, the rotational speed of the motor 10 which drives the laundry drum is controlled by the control means (microcontroller), also referred to as a control device. To this end, the control device 14 monitors, at its input 14*a*, the speed signal which the motor 10 generates in its tachogenerator 20 and which is converted into a digital signal in an A/D converter 22, with the frequency of the digital signal being proportional to the rotational speed of the motor 10.

The control means or control device 14 also has an output 14*c* for outputting a control command for activating and/or deactivating the door lock 12. As an alternative, the door lock 12 can be activated by closing the door of the washing machine. Here, the door lock is illustrated with a 230V power supply. Any other suitable voltage, of course, such as 115 V, is equally possible. The control command for deactivating the door lock 12, together with an actuation circuit 24, generates a triggering signal for a triac 26 which releases the lock of the door by means of the door lock 12. The operating state of the door lock 12 is fed back to a monitoring input 14*b* of the control device 14 in order to be able to identify and possibly indicate the state "door unlocked".

The "normal" control sequence of this control apparatus is as follows, with reference to FIG. 2.

The main control program is executed in first instance in step S2 after the washing machine is switched on in step S1. In step S3, the control device 14 checks whether there is a request to open the door. If there is no request to open the door ("N" in step S3), the control sequence returns to step S2.

If, in contrast, the door is to be opened ("Y" in step S3), the control sequence moves on to step S4 in which it is determined whether a detected rotational speed of the motor 10 of the laundry drum is lower than a predetermined threshold value or not. If the rotational speed is still above this threshold value ("N" in step S4), step S4 is repeated. The control sequence moves on to step S5 in order to deactivate the door lock 12, that is to say to unlock the door so that it can be opened by the user, only when the rotational speed is sufficiently low ("Y" in step S4), so that the deactivation operating range of the motor 10 is present, that is to say a state which is dangerous to a user no longer exists.

Whereas the dangerous state of the dangerous component 10 has been assumed to be a high rotational speed of the motor of the laundry drum in this example, it is also possible, as an alternative or in addition, for a high water level or a high temperature to be used as the dangerous state.

Figure 3:
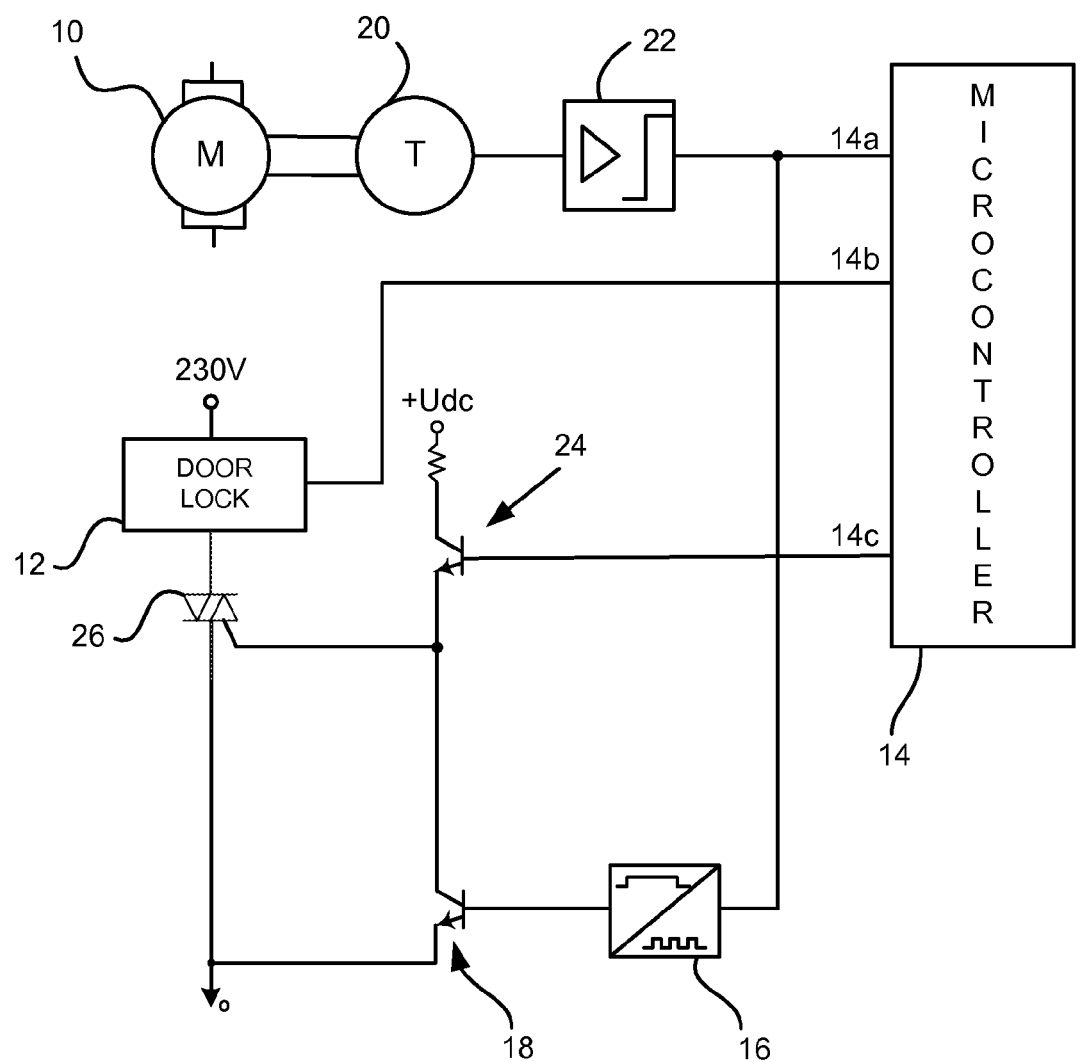
FIG. 3 is a simplified block diagram of the control apparatus from FIG. 1 with a protection device and a protection-device monitoring device according to a preferred exemplary embodiment.

In order to increase the security of the washing machine against impermissible unlocking of the door, the control apparatus also has a protection device, as illustrated in FIG. 3.

A feedback line branches off from the signal line of the tachogenerator 20 to the control input 14*a* of the control device, and an integrator 16 is provided in said feedback line and generates an output signal with a positive voltage from the square-wave speed signal as long as the square-wave signal is present at its input. This output signal of the integrator 16 turns on a transistor 18 which blocks any triggering signal of the actuation circuit 24 for the triac 26. When there is no speed signal, that is to say the motor 10 is stationary, the output signal of the integrator 16 changes to 0 V, so that the transistor 18 is turned off. Therefore, it is now possible for the deactivation signal 14*c* of the control device 14 to generate a triggering signal for the triac 26 in the above-described manner and thus to deactivate the door lock 12. The additional protection device 16-18 is also called a PEC (Protective Electronic Circuit).

However, as explained in the introduction to the description, there is the risk of a "latent fault" when this protection device has a malfunction. If, for example, the control device outputs a deactivation signal 14*c* to the door lock 12 on account of a further defect at a high motor rotational speed, there would no longer be a protection function and the door would be unlocked despite the motor 10 or the laundry drum being in a dangerous state.

In order to avoid this problem, the apparatus proposes an additional protection-device monitoring device for the control apparatus, which protection-device monitoring device is implemented as a software sequence in the control device 14 (that is to say makes do without additional hardware components) and whose functioning will now be described in greater detail with reference to the flowchart of FIG. 4.

After the washing machine is switched on in step S1, firstly the "normal" control sequence (steps S2 to S5), which has already been explained with reference to FIG. 2, and, parallel to this, a control sequence of the protection-device monitoring device (steps S6 to S9) are carried out. Since the "normal" control sequence of steps S2 to S5 is unchanged, the said control sequence is not described again.

In the control sequence of the protection-device monitoring device, a check is first made in step S6 to determine whether the dangerous component 10 is within its simulation operating range, that is to say whether it is outside its deactivation operating range, but the desired rotational speed of the motor 10 of the laundry drum is still below a prespecified threshold value and the dangerous component 10 is therefore still within an operating range which does not present a danger to the user. The assessment of step S6 is repeated until the motor 10 is in the safe simulation operating range ("Y" in step S6). If the desired rotational speed of the motor 10 is so low that the door could still be opened without presenting a danger, the protection-device monitoring device attempts to deactivate the door lock 12 in step S7 using an appropriate actuation signal.

If the above-described protection device 16-18 for the door lock 12 is functional, it prevents this deactivation of the door lock 12 in the simulation operating range of the motor 10. However, if the protection device exhibits a malfunction, the door is unlocked. Since a check is made in step S8 to determine whether the door has been unlocked or not, that is to say whether the door lock 12 has been deactivated or not, the control device 14, to whose input 14*b* the operating state of the door lock 12 is reported, can identify a malfunction of the protection device 16-18. If the above simulation process were also performed during the safe deactivation operating range of the motor, the protection device 16-18 would permit deactivation of the protection component 12 as is intended, that is to say a malfunction of the protection device would not be identifiable. The simulation operating range of the motor is therefore defined as its safe operating range outside the deactivation operating range.

When such a malfunction of the protection device 16-18 ("Y" in step S8) is identified, the control device 14 switches to a fault mode in which, for example, further operation of the washing machine is (permanently) prevented in step S9. If, in contrast, the protection device 16-18 operates correctly ("N" in step S8), the control sequence returns to step S6 in order to repeat the above simulation of deactivation of the door lock 12 by the protection-device monitoring device.

A "latent fault" of the protection device 16-18 can be reliably identified with the aid of this protection-device monitoring device (S6-S9), so that suitable countermeasures for preventing a danger to the user can be initiated if necessary.

In the above-described control sequence of the protection-device monitoring device (S6-S9), the safe simulation operating range of the dangerous component 10 would be defined by means of a desired rotational speed of the motor of the laundry drum in step S6. As an alternative or in addition to this, the actual rotational speed of the motor can also be used.

It goes without saying that other variables can also be used here, depending on the type of dangerous component 10 of the electrical domestic appliance.

Figure 4:
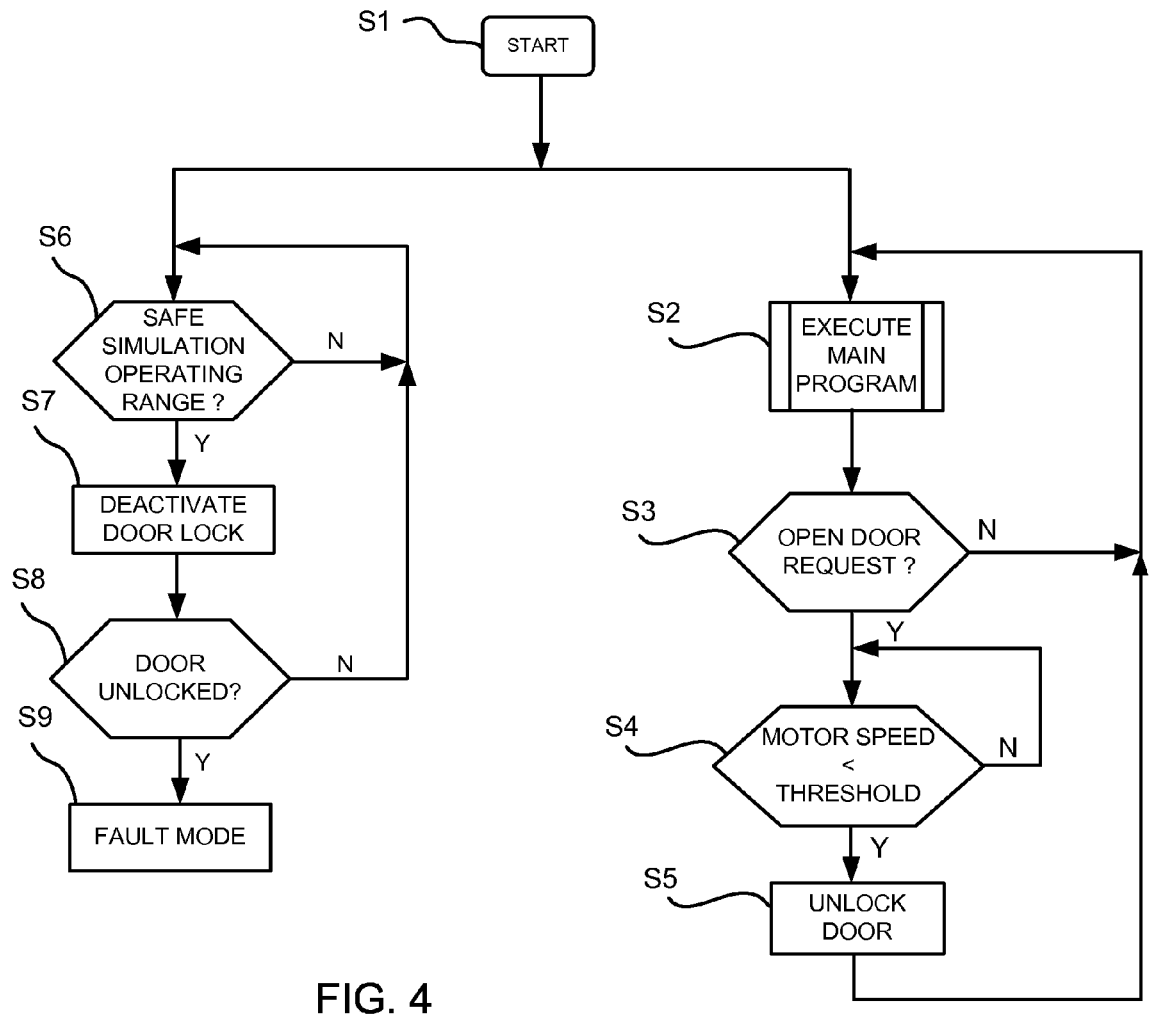
FIG. 4 is a flowchart of a control sequence of the control apparatus of FIG. 3.

Furthermore, the simulation of the deactivation of the door lock 12 was carried out continuously in the control sequence of the protection-device monitoring device (S6-S9) which is illustrated in FIG. 4. However, as an alternative, this process can also be executed within the scope of the present invention as follows:

once after the electrical domestic appliance is switched on;

once before a program sequence portion of the control device 14, in which portion a dangerous state of the dangerous component 10 could occur;

at regular time intervals; or in each case before a program sequence portion of the control device 14, in which portion a dangerous state of the dangerous component 10 could occur.

Furthermore, a changeover was made to a fault mode (step S9) in the above control sequence of FIG. 4 after a malfunction of the protection device 16-18 was identified. It is likewise possible to first verify the faulty state of the protection device 16-18 by repeating method steps S6 to S8, before the fault state is conclusively identified and a changeover is made to the fault mode.

In addition, the protection-device monitoring device S6-S9 was implemented as a software sequence in the control device 14 in the above-described exemplary embodiment. In this way, no additional hardware components are required in comparison to conventional control apparatuses, and the said device can also be implemented without problems in existing circuits.

Figure 5:
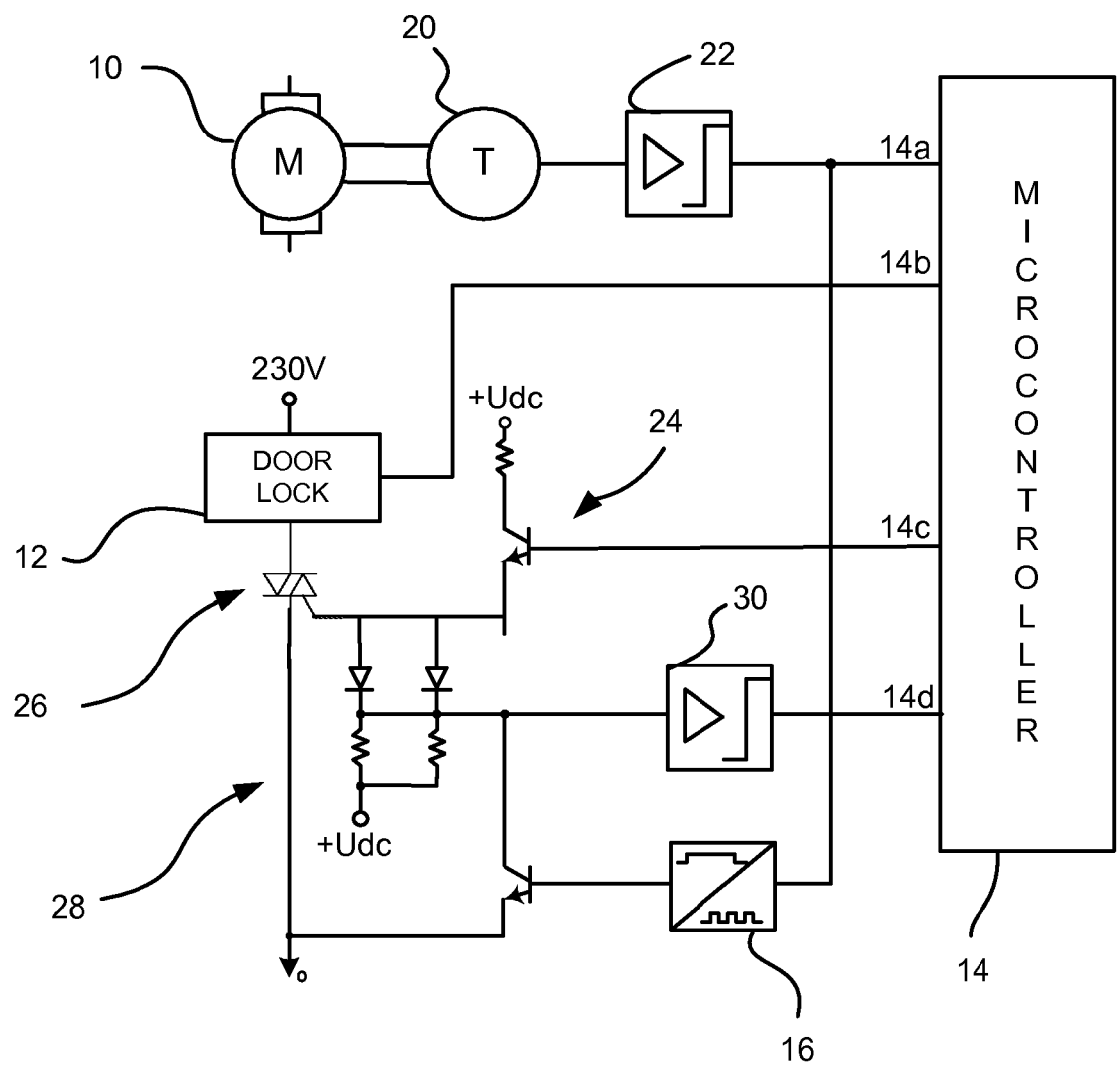
FIG. 5 shows a simplified block diagram of the control apparatus from FIG. 1 with a protection device and an alternative protection-device monitoring device.

However, as an alternative, it is also feasible to form the protection-device monitoring device by means of hardware, as is illustrated in FIG. 5. For this purpose, the control apparatus has, in addition to the structure of the control apparatus from FIG. 3, a coupling-out device 28 for coupling out the output signal of the protection device 16-18 and an A/D converter 30 for digitizing the output signal coupled-out in this way.

The control device 14 can check the functionality of the protection device on the basis of the output signal of the protection device 16-18 which is supplied to a further input 14d. In order to prevent failure of this protection-device monitoring device 28-30, the components of the coupling-out device 28 are provided in duplicate, as illustrated in FIG. 5. Disadvantages of these variants include the additionally required hardware components 28 and 30 and a further required input 14d at the microcontroller 14.

The invention claimed is:

1. A control apparatus for an electrical domestic appliance having a dangerous component potentially posing a danger to a user and a protection component for protecting the user against the danger posed by the dangerous component, the control apparatus comprising:

a control device configured to monitor operating states of the dangerous component and the protection component, and to selectively activate and deactivate the protection component; and a protection device configured to prevent a deactivation of the protection component by said control device outside a deactivation operating range of the dangerous component in which deactivation is permissible;

a protection-device monitoring device configured to initiate a deactivation of the protection component within a simulation operating range of the dangerous component, in which range the operating state of the dangerous component does not present a danger to the user and which range is outside the deactivation operating range; and said control device being configured to identify a malfunction of the protection device if the protection component is actually deactivated when deactivation of the protection component is initiated by the protection-device monitoring device.

2. The control apparatus according to claim 1, wherein said protection-device monitoring device is implemented as a software sequence in said control device.

3. The control apparatus according to claim 1, wherein said protection device is implemented as a software sequence in said control device.

4. The control apparatus according to claim 1, wherein the electrical domestic appliance is a washing machine, and the protection component is a door lock of the washing machine.

5. The control apparatus according to claim 4, wherein:

the dangerous component is a laundry drum of the washing machine or a motor for the laundry drum; and one or both of the deactivation operating range and the simulation operating range of the dangerous component are defined by way of a rotational speed, a water level, and/or a temperature of the laundry drum of the washing machine.

6. The control apparatus according to claim 1, wherein said protection-device monitoring device is configured to deactivate the protection component:

once after the electrical domestic appliance is switched on; or once before a program sequence portion of said control device during which a dangerous state of the dangerous component could occur; or at regular time intervals; or in each case before a program sequence portion of said control device during which a dangerous state of the dangerous component could occur; or continuously.

7. The control apparatus according to claim 1, wherein said control device is configured to verify a malfunction of the protection device by repeated identification of the malfunction.

8. The control apparatus according to claim 1, wherein said control device is configured to prevent an operation of the electrical domestic appliance when a malfunction of the protection device is identified.

9. A control method for an electrical domestic appliance having a dangerous component potentially posing a danger to a user and including the control apparatus of claim 1, which includes the protection component for protecting the user against the danger posed by the dangerous component, and the control device for activating and/or deactivating the protection component, the method which comprises the following method steps:

monitoring the operating states of the dangerous component and the protection component by the control device;

preventing a deactivation of the protection component by the control device outside a deactivation operating range of the dangerous component, in which range the deactivation of the protection component is permissible;

initiating a deactivation of the protection component within a simulation operating range of the dangerous component, in which range the operating state of the dangerous component does not present a danger to the user and which lies outside the deactivation operating range, by a protection-device monitoring device; and identifying a malfunction of the protection device if the protection component is actually deactivated when deactivation of the protection component is initiated by the protection-device monitoring device.

10. The control method according to claim 9, wherein:

the electrical domestic appliance is a washing machine;

the protection component is a door lock or the washing machine;

the dangerous component is a laundry drum of the washing machine or a motor for the laundry drum; and at least one of the deactivation operating range and the simulation operating range of the dangerous component is defined by a rotational speed, a water level, and a temperature of the laundry drum of the washing machine.

11. The control method according to claim 9, which comprises activating the protection component with the protection-device monitoring device:

once after the electrical domestic appliance is switched on; or once before a program sequence portion of the control device, in which portion a dangerous state of the dangerous component could occur; or at regular time intervals; or in each case before a program sequence portion of the control device, in which portion a dangerous state of the dangerous component could occur; or continuously.

12. The control method according to claim 9, which comprises verifying an identified malfunction of the protection device by repeated identification of the malfunction.

13. The control method according to claim 9, which comprises preventing an operation of the electrical domestic appliance when a malfunction of the protection device is identified.

* * * * *